United States Patent
Aitken et al.

(10) Patent No.: US 11,708,298 B2
(45) Date of Patent: Jul. 25, 2023

(54) TRANSPARENT TANTALUM OXIDE GLASS-CERAMICS AND TRANSPARENT ALUMINUM TANTALATE GLASS-CERAMICS

(71) Applicant: Corning Incorporated, Corning, NY (US)

(72) Inventors: Bruce Gardiner Aitken, Corning, NY (US); Randall Eugene Youngman, Horseheads, NY (US)

(73) Assignee: CORNING INCORPORATED, Corning, NY (US)

(*) Notice: Subject to any disclaimer, the term of this patent is extended or adjusted under 35 U.S.C. 154(b) by 8 days.

(21) Appl. No.: 17/494,996

(22) Filed: Oct. 6, 2021

(65) Prior Publication Data

US 2022/0024810 A1    Jan. 27, 2022

Related U.S. Application Data

(63) Continuation of application No. 16/970,187, filed as application No. PCT/US2019/016687 on Feb. 5, 2019, now Pat. No. 11,168,020.

(60) Provisional application No. 62/630,449, filed on Feb. 14, 2018.

(51) Int. Cl.
     *C03C 10/02*          (2006.01)
     *C03C 10/00*          (2006.01)

(52) U.S. Cl.
     CPC ...... *C03C 10/0009* (2013.01); *C03C 10/0054* (2013.01); *C03C 2204/00* (2013.01)

(58) Field of Classification Search
     CPC .......................... C03C 10/00; C03C 10/0009
     See application file for complete search history.

(56) References Cited

U.S. PATENT DOCUMENTS

| | | | |
|---|---|---|---|
| 3,717,441 A | 2/1973 | Rappc | |
| 4,017,317 A ‡ | 4/1977 | Rapp | C03C 10/0018 501/901 |
| 4,047,960 A ‡ | 9/1977 | Reade | C03C 10/0009 501/63 |
| 4,141,738 A ‡ | 2/1979 | Rapp | C03C 10/00 501/48 |
| 7,323,426 B2 ‡ | 1/2008 | Aitken | C03C 3/064 501/63 |
| 2011/0071011 A1* | 3/2011 | Fujisawa | C03C 3/085 501/68 |
| 2012/0114955 A1* | 5/2012 | Almoric | C03C 10/0054 501/41 |
| 2014/0135201 A1* | 5/2014 | Chauvel-Melscoet | C03C 10/0054 501/4 |
| 2014/0335473 A1 ‡ | 11/2014 | Ritzberger | C04B 37/042 252/301.4 |
| 2015/0374465 A1 ‡ | 12/2015 | Bürke | A61C 5/73 433/201.1 |
| 2017/0088456 A1 ‡ | 3/2017 | Rampf | C03C 10/0009 |

OTHER PUBLICATIONS

Invitation to Pay Additional Fees of the International Searching Authority; PCT/US2019/016687 dated Apr. 17, 2019; 16 Pages; European Patent Office.‡
Gleizes et al; "Temperature Dependent 4-, 5- and 6-Fold Coordination of Aluminum in MOCVD-Grown Amorphous Alumina Films: From Local Coordination to Material Properties"; Advances in Science and Technology, 2014; vol. 91, pp. 123-133.‡

\* cited by examiner
‡ imported from a related application

*Primary Examiner* — Karl E Group

(57) ABSTRACT

A transparent glass-ceramic composition including: of the formula $Ta_{2-x}Al_xO_{5-x}$ where x is less than 1; of the formula $AlTaO_4$; of the formula $AlPO_4$; a mixture of $AlTaO_4$ and $AlPO_4$; or a mixture of the formula $Ta_{2-x}Al_xO_{5-x}$, $AlTaO_4$, and $AlPO_4$. Also disclosed are transparent glass-ceramic compositions including, for example, a dopant as defined herein, or a supplemental metal oxide or metalloid oxide of $M_xO_y$, $M_xM'_xO_y$, or a mixture thereof such as oxides of Nb, Ti, W, B, or Ga, as defined herein. Also disclosed are methods of making the disclosed transparent glass-ceramic compositions, and optical articles, optical components, and optical apparatus thereof.

16 Claims, 11 Drawing Sheets

TRANSPARENT TANTALUM OXIDE GLASS-CERAMICS AND TRANSPARENT ALUMINUM TANTALATE GLASS-CERAMICS

CROSS-REFERENCE TO RELATED APPLICATIONS

This application is a continuation application and claims the benefit of priority under 35 U.S.C. § 120 of U.S. Non-Provisional patent application Ser. No. 16/970,187, filed on Aug. 14, 2020, which claims the benefit of priority under 35 U.S.C. § 371 to International Application Serial No. PCT/US2019/016687, filed on Feb. 5, 2019, which claims the benefit of priority under 35 U.S.C. § 119 to U.S. Provisional Application Ser. No. 62/630,449, filed on Feb. 14, 2018, the contents of which are relied upon and incorporated herein by reference in their entirety as if fully set forth below.

The entire disclosure of each publication or patent document mentioned herein is incorporated by reference.

BACKGROUND

The disclosure relates to transparent tantalum oxide glass-ceramics and transparent aluminum tantalate glass-ceramics.

SUMMARY

In embodiments, the disclosure provides a transparent tantalum oxide containing glass-ceramic, or a transparent aluminum tantalate containing glass-ceramic.

In embodiments, the disclosure provides a transparent glass-ceramic containing tantalum oxide or aluminum tantalate, and additionally including a metal or metal oxide supplement or complement such as Nb, Ti, or W, and more specifically a metal oxide supplement such as $Nb_2O_5$, $TiO_2$ or $WO_3$.

In embodiments, the disclosure provides a transparent glass-ceramic containing tantalum oxide or aluminum tantalate, and additionally including a metal or metalloid supplement or complement such as B or $B_2O_3$ while maintaining or reducing the other glass constituents such as the Si content.

In embodiments, the disclosure provides a transparent glass-ceramic containing tantalum oxide or aluminum tantalate, and additionally including a metal or metalloid supplement or complement such as Ga or $Ga_2O_3$ while maintaining or reducing the other glass constituents such as the Al content.

In embodiments, the disclosure provides a transparent glass-ceramic containing tantalum oxide or aluminum tantalate, and additionally including a performance enhancing dopant.

In embodiments, the disclosure provides a method of making a transparent glass-ceramic from certain Ta-containing aluminophosphosilicate glasses.

In embodiments, the disclosure provides a method of making a transparent glass-ceramic having a major crystalline phase of either Al-containing $Ta_2O_5$ when cerammed at low temperatures, or $AlTaO_4$ when cerammed at high temperature.

BRIEF DESCRIPTION OF THE DRAWINGS

In embodiments of the disclosure.

DETAILED DESCRIPTION

Figure 1:
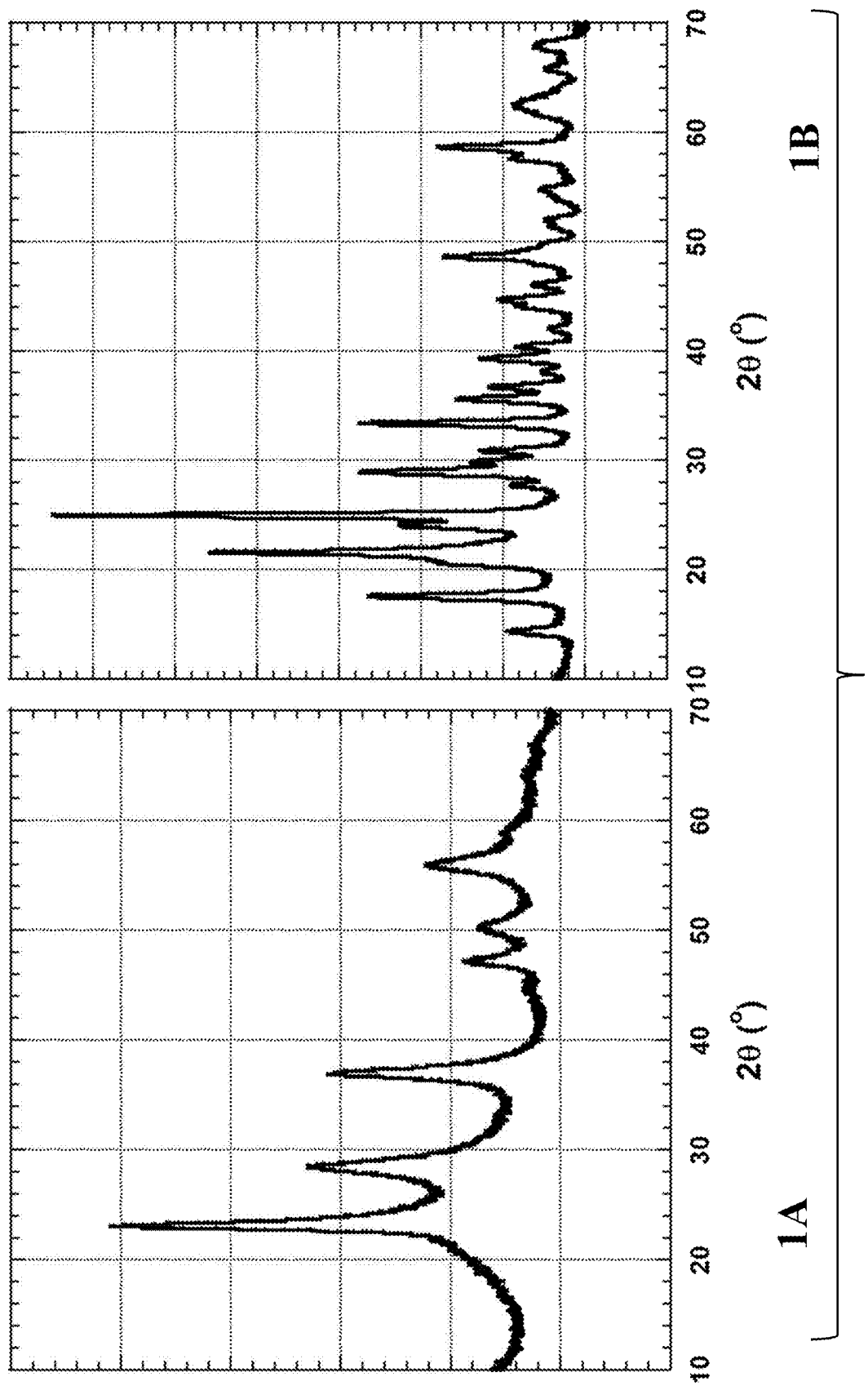
FIGS. 1A and 1B show different X-ray diffraction patterns of the same source composition $9Ta_2O_5$:15 $Al_2O_3$:$6P_2O_5$:$70SiO_2$ that was separately cerammed under different conditions of: 925° C. for 2 hrs (FIG. 1A); and 1075° C. for 2 hrs (FIG. 1B).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed compositions, and methods of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"$Ta_2O_5$" has two different but related meanings in the present disclosure. In batch or source ingredient circumstances "$Ta_2O_5$" refers to a source of $Ta_2O_5$. In cerammed transparent glass-ceramic composition circumstances "$Ta_2O_5$" refers to $Ta_{2-x}Al_xO_{5-x}$ where x is significantly less than 1, as defined herein.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description can include instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Glass-ceramics are well known as materials that provide the excellent properties of polycrystalline ceramics and the possibility of zero porosity and the ability to make complex shapes via traditional glass forming techniques. However, most glass-ceramics are opaque due to the difficulty of: maintaining the size of the crystallite population below visible light wavelengths; minimizing the refractive index contrast between the dominant crystal phase and residual glass; or both. Some transparent glass-ceramic "families" are known, notably the β-quartz and petalite glass-ceramics from the Li aluminosilicate system and the mullite glass-ceramics from the aluminosilicate system, but they are relatively rare. Even rarer are transparent glass-ceramics where the major crystalline phase is a non-silicate, with the only major example being the spinel glass-ceramics from the Zn/Mg aluminosilicate system. Such materials are of particular interest for scratch-resistant cover glass applications, fluorescence applications when doped with optically-active transition metal or rare earth ions, and like applications. Other unknown transparent glass-ceramic systems having a non-silicate major phase are of interest.

U.S. Pat. No. 7,323,426, entitled HIGH STRAIN POINT GLASSES, mentions a family of glasses from the $SiO_2$—$Al_2O_3$—$P_2O_5$ ternary system exhibiting high strain point, transparency, and low coefficients of thermal expansion. The glasses have the following composition, expressed in mol percent and calculated from the glass batch on an oxide basis: 55 to 80% $SiO_2$, 12 to 30% $Al_2O_3$, and 2 to 15% $P_2O_5$.

In embodiments, the disclosure provides a transparent glass-ceramic composition (i.e., the Si—Al—Ta—P transparent glass-ceramic compositions) comprising:
  65 to 75% $SiO_2$;
  10 to 25% $Al_2O_3$;
  5 to 15% $Ta_2O_5$; and
  3 to 10% $P_2O_5$, based on 100 mol % total.

In embodiments, the disclosure provides a transparent glass-ceramic composition comprising, for example, 70% $SiO_2$, 14.5% $Al_2O_3$, 7.5% $P_2O_5$, and 8% $Ta_2O_5$ based on 100 mol % total.

In embodiments, the glass-ceramic composition can further comprise, for example, $SnO_2$ in from 0.01 to 2 mol %, by inclusion in the total 100 mol % (i.e., not super addition).

In embodiments, the $Ta_2O_5$ content in the transparent glass-ceramic composition can be, for example, of from 5 to 14 mol %, or of from 8 to 12 mol %, including intermediate values and ranges.

In embodiments, the transparency (i.e. allowing passage of light, e.g., some or most wavelengths in visible spectrum, about 390 to 700 nm) of the composition can be demonstrated when, for example, the composition is cast as a one half inch thick specimen and is generally visibly clear to, for example, a human viewer or other trained observer.

In embodiments, the disclosed transparent composition has a refractive index that can be, for example, of from 1.55 to 1.61; the elastic modulus can be, for example, of from 50 to 95 GPa; and the hardness can be, for example, of from 6 to 9 GPa.

In embodiments, the disclosed transparent composition can have a crystallite size, for example, of from 5 to 25 nm, including intermediate values and ranges.

In embodiments, the disclosure provides transparent glass-ceramic compositions having a portion such as from 0.1 to 50 mol % of the Ta content of the above mentioned Si—Al—Ta—P transparent glass-ceramic compositions supplemented (i.e., partially substituted or replaced) or complemented (i.e., an ingredient that completes the composition) with, for example, Nb, Ti, or W, to produce Si—Al—Ta—P—Nb transparent glass-ceramic compositions, Si—Al—Ta—P—Ti transparent glass-ceramic compositions, or Si—Al—Ta—P—W transparent glass-ceramic compositions.

In embodiments, the disclosure provides a metal supplemented transparent glass-ceramic composition comprising, for example:
  65 to 75% $SiO_2$;
  10 to 25% $Al_2O_3$;
  4 to 7.5% $Ta_2O_5$;
  0.01 to 7.5% $M_xO_y$ or $M_xM'_xO_y$; and
  3 to 10% $P_2O_5$, based on 100 mol % total,
wherein in the formulas $M_xO_y$ or $M_xM'_xO_y$, M or M' is selected from the group of a source of Nb, Ti, W, Al, B, Ga, or a mixture thereof, x and x' are independently an integer from 1 to 2, and y is an integer from 1 to 5. $M_xO_y$ can be, for example, $Nb_2O_5$, $TiO_2$, $WO_3$, and like oxides. $M_xM'_xO_y$ can be, for example, $Al_2TiO_5$, $B_2O_3$, $Ga_2O_3$, and like oxides, which metal oxide or metalloid oxide can provide a primary or supplemental source of $TiO_2$, $Al_2O_3$, or like oxides. In embodiments, the $M_xO_y$ can have, for example, a formal valence of $4^+$, $5^+$, or $6^+$.

In embodiments, a transparent glass-ceramic composition can have a metal (M) supplement of a Nb source and the Nb can be present in an amount of from 0.1 to 50 mol % of the Ta content, and 4 to 7.5% $Ta_2O_5$ and 0.01 to 7.5% Nb in the composition. The supplementation with Nb produces a Si—Al—Ta—P—Nb transparent glass-ceramic composition.

In embodiments, a transparent glass-ceramic composition can have a metal (M) supplement of a Ti source and the Ti can be present in an amount of from 0.1 to 25 mol % of the Ta content, and 4 to 11.25 mol % $Ta_2O_5$ and 0.01 to 3.75 mol % Ti in the composition. The supplementation with Ti produces a Si—Al—Ta—P—Ti transparent glass-ceramic composition.

In embodiments, a transparent glass-ceramic composition can have a metal (M) supplement of a W source and the W can be present in an amount of from 0.1 to 25 mol % of the Ta content, and 4 to 11.25 mol % $Ta_2O_5$ and 0.01 to 3.75 mol % W in the composition. The supplementation with Ti produces a Si—Al—Ta—P—W transparent glass-ceramic composition.

In embodiments, the disclosed transparent glass-ceramic composition can further comprise, for example, a dopant in an amount of 1 mol % or less, for example, of from 0.01 to 1 mol %, of from 0.1 to 0.9 mol %, of from 0.1 to 0.85 mol %, of from 0.5 to 0.8 mol %, of from 0.5 to 0.75 mol %, including intermediate values and ranges, based on the 100 mol %. The dopant can be selected from the group of, for example, a Cr oxide, a Ni oxide, a Co oxide, a rare earth oxide, or mixtures thereof. Other dopants of interest can include, for example, Ti, V, Mn, Cu, Er, and like oxide dopants, or mixtures thereof.

In embodiments, the oxide dopant can be, for example, selected from $Cr_2O_3$, NiO, CoO, $Er_2O_3$, or a mixture thereof.

In embodiments, the resulting transparent glass-ceramic composition preferably contains at least 5 mol % or more of $Ta_2O_5$, which permits the glass-ceramic composition to be a transparent glass-ceramic product.

In preferred embodiments, the resulting transparent glass-ceramic composition preferably contains at least about 10 mol % $Ta_2O_5$.

In other more preferred embodiments, the resulting transparent glass-ceramic composition preferably contains at least about 8 mol % $Ta_2O_5$.

In embodiments, the precursor glass preferably contains at least 3 mol % or more of $P_2O_5$, which $P_2O_5$ content permits the precursor glass to melt at or below 1650° C., and avoids phase separation and opacity in the resulting transparent glass-ceramic composition.

In embodiments, the disclosure provides a more preferred transparent glass-ceramic composition comprising:
  65 to 72% $SiO_2$;
  10 to 20% $Al_2O_3$;
  4 to 9% $P_2O_5$; and
  8 to 13% $Ta_2O_5$, based on 100 mol %.

In embodiments, an example of the more preferred transparent glass-ceramic composition can be, for example:
  70% $SiO_2$;
  14.5% $Al_2O_3$;
  7.5% $P_2O_5$; and
  8 to 13% $Ta_2O_5$, based on 100 mol % total.

In embodiments, the composition of the crystalline phase of the more preferred transparent glass-ceramic composition can be, for example: of the formula $Ta_{2-x}Al_xO_{5-x}$ where x is less than 1 such as x is of from 0.001 to 0.2, 0.01 to 0.15, 0.01 to 0.1, including intermediate values and ranges.

In embodiments, x in the formula $Ta_{2-3}Al_xO_{5-x}$ can be, for example, from about 0.001 to about 0.99 mol %, from about 0.01 to about 0.9 mol %, from about 0.1 to about 0.8 mol %, from about 0.1 to about 0.7 mol %, from about 0.1 to about 0.6 mol %, and from about 0.1 to about 0.5 mol %, including intermediate values and ranges.

In embodiments, the disclosed transparent glass-ceramic composition has a crystallite size of from 5 to 25 nm.

In embodiments, the disclosure provides a boron supplemented or complemented transparent glass-ceramic composition comprising:
  60 to 70% $SiO_2$;
  10 to 25% $Al_2O_3$;
  4 to 7.5% $Ta_2O_5$;
  0.01 to 5% $B_2O_3$; and
  3 to 10% $P_2O_5$, based on 100 mol % total, In embodiments, the $SiO_2$ content can be partially supplemented or replaced by, for example, of from 0.01 to 5 mol % $B_2O_3$.

In embodiments, the disclosure provides a gallium supplemented or complemented transparent glass-ceramic composition comprising:
  65 to 75% $SiO_2$;
  2 to 17% $Al_2O_3$;
  4 to 7.5% $Ta_2O_5$;
  0.01 to 8% $Ga_2O_3$; and
  3 to 10% $P_2O_5$, based on 100 mol % total, In embodiments, $Al_2O_3$ can be partially supplemented or replaced by, for example, of from 0.1 to 8 mol % $Ga_2O_3$. In supplemental amounts of greater than of from 8 mol % $Ga_2O_3$ there may be some objectionable opalization of the precursor glasses and opacity in the resultant glass-ceramics.

In particularly preferred embodiments, the disclosure provides a method of making the aforementioned transparent glass-ceramic composition, comprising, for example:
  ceramming a suitable precursor glass composition at 900 to 950° C. for about 2 hrs, to produce a transparent glass-ceramic of the formula $Ta_{2-x}Al_xO_{5-x}$ where x in this formula is less than 1.

In embodiments, the method of making the aforementioned transparent glass-ceramic composition, can further comprise, for example, including a dopant in an amount of 1 mol % or less based on the 100 mol % of the suitable precursor glass composition, and the dopant can be selected, for example, from the group of a Cr oxide, a Ni oxide, a Co oxide, a rare earth oxide, or a mixture thereof. Other dopants can include, for example, Ti, V, Mn, Cu, Er, and like dopants, such as their oxides and like sources, or mixtures thereof.

In preferred embodiments, a method of making the aforementioned transparent glass-ceramic composition, can comprise, for example:
  ceramming a suitable precursor glass composition at, for example, of from 1000 to 1100° C. for about 2 hrs, to produce a transparent glass-ceramic of the formula of a mixture of $AlTaO_4$ and $AlPO_4$ (i.e., AT+AP). A suitable precursor glass composition can be, for example, the aforementioned preferred or more preferred transparent glass-ceramic composition.

In embodiments, the method of making any of the preceding transparent glass-ceramic compositions, can further comprise, for example: including a dopant in an amount of 1 mol % or less based on the 100 mol % total of the suitable precursor glass composition, and the dopant can be selected, for example, from the group of a Cr oxide, a Ni oxide, a Co oxide, a rare earth oxide, or mixtures thereof. Other transition metal dopants can include, for example, Cr, Ni, Co, V, Mn, Cu, Er, and like oxide dopants or equivalent metal sources, or mixtures thereof.

When cerammed at low temperatures, the disclosed transparent glass-ceramics are believed to be the first known glass-ceramics, transparent or opaque, which include Al-containing $Ta_2O_5$ as the dominant crystal phase. The transparency of these materials is particularly remarkable and unexpected in view of the large refractive index contrast or difference between the Ta-containing crystalline phases and the silica-rich residual glass.

In embodiments, the present disclosure is advantaged in several aspects, including for example: the presence of Ta in the crystalline phases causes these materials to have a higher refractive index than other transparent glass-ceramics (e.g., spinel: 1.586). Other transparent glass-ceramics can become translucent or opaque when heated above 1000° C. Unexpectedly, the presently disclosed glass-ceramic compositions retain their transparency to at least 1100° C. In addition, the presently disclosed glass-ceramic compositions provide a unique crystalline environment for transition metal dopants and allow one to tailor the luminescent properties of the transparent glass-ceramics. The crystalline environment can provide a host site, for example, for a transition metal dopant or rare earth dopant.

In embodiments, the present disclosure provides a transparent $Ta_2O_5$ glass-ceramic, a transparent $AlTaO_4$ glass-ceramic, a transparent glass-ceramic containing a mixture of $Ta_2O_5$ and $AlTaO_4$, or a mixture thereof. These disclosed glass-ceramics can be made by, for example, heat treatment of a suitable precursor glass having a composition comprising or consisting of, for example: 5 to 15% $Ta_2O_5$, 10 to 25% $Al_2O_3$, 3 to 10% $P_2O_5$, and 65 to 75% $SiO_2$ based on a 100 mol % total. The precursor glasses, but not glass-ceramics, having these compositions were disclosed in the above-mentioned U.S. Pat. No. 7,323,426.

In the present disclosure when exemplary precursor glasses were individually cerammed at temperatures of from 900 to 950° C., the crystalline phase has the $Ta_2O_5$ structure (FIG. 1A). However, the $^{27}Al$ MAS NMR spectra of such materials show that this crystalline phase contains some aluminum (Al) in solid solution (FIG. 2) and its composition is better described by the formula $Ta_{2-x}Al_xO_{5-x}$, where x in this formula is less than 1. Maximum transparency of these $Ta_{2-x}Al_xO_{5-x}$ glass-ceramics is observed when their glass precursors are cerammed at temperatures in the lower portion of the above-mentioned range, i.e., 900 to 950° C. When heat treated at temperatures above 900 to 950° C. but below 1,000° C., the resulting $Ta_{2-x}Al_xO_{5-x}$ glass-ceramics can become slightly hazy. As indicated in the accompanying Table 1 and Table 2, these $Ta_{2-x}Al_xO_{5-x}$ glass-ceramics are characterized by an elastic modulus of from 77 to 91 GPa.

When the precursor glasses are cerammed at top temperatures in the range of from about 975 to 1000° C., the crystalline assemblage of the resultant transparent glass-ceramics are a mixture of $Ta_{2-x}Al_xO_{5-x}$ and $AlTaO_4$. While not bound by theory, it is believed that $Ta_{2-x}Al_xO_{5-x}$ gradually reacts with residual glass to form $AlTaO_4$ in response to heating in this temperature range. With increasing top temperature, the volume fraction of $AlTaO_4$ increases relative to that of $Ta_{2-x}Al_xO_{5-x}$ based on XRD results.

When the precursor glasses are cerammed at top temperatures in of from about 1025 to 1050° C., the crystalline assemblage of the resultant transparent glass-ceramics are a mixture of $Ta_{2-x}Al_xO_{5-x}$, $AlTaO_4$, and $AlPO_4$. With increasing top temperature, the volume fraction of $AlTaO_4$ continues to increase relative to that of $Ta_{2-x}Al_xO_{5-x}$ as the reaction between the $Ta_{2-x}Al_xO_{5-x}$ phase and residual glass progresses towards completion.

Figure 3:
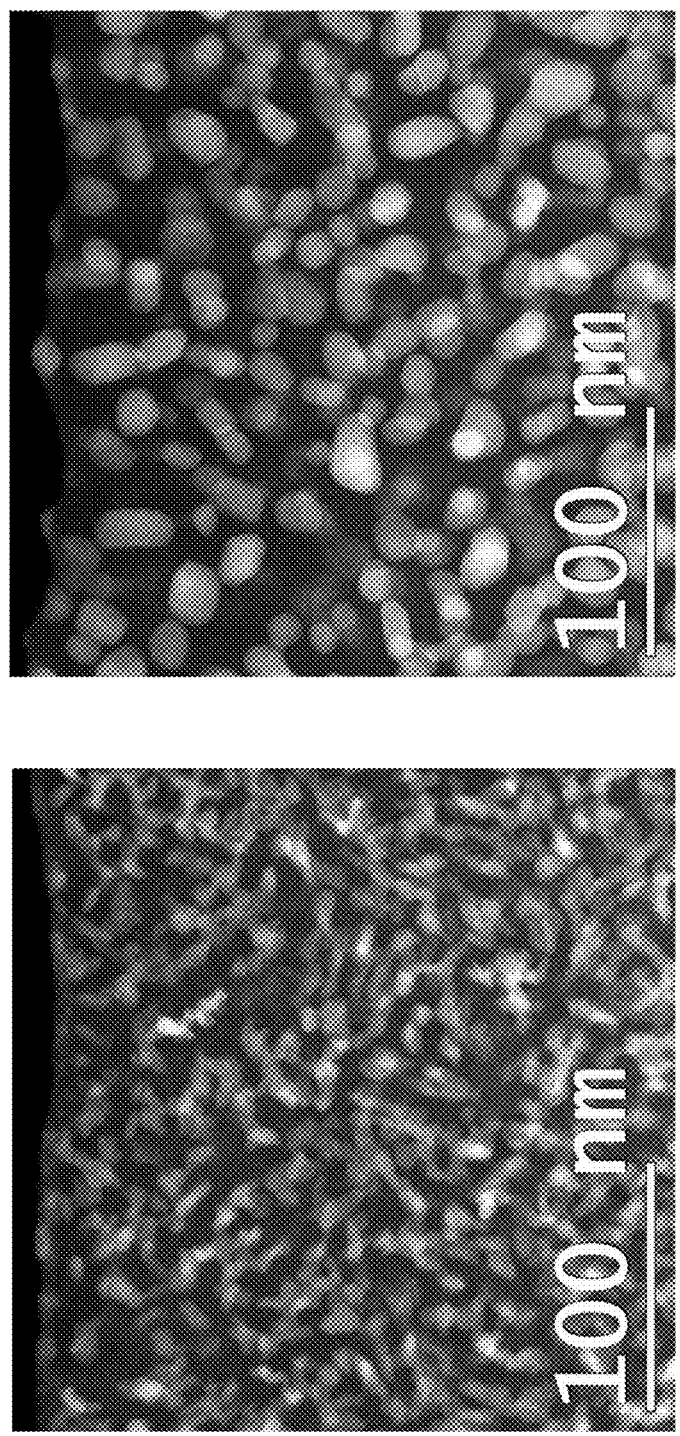
FIGS. 3A and 3B show TEM photomicrograph images of glass 1 (Example 4 in Table 1).

When the precursor glasses are cerammed at top temperatures of from about 1075 to 1100° C., the crystalline assemblage can be, for example, a mixture of $AlTaO_4$ and $AlPO_4$ (FIG. 1B). The transparency of these $AlTaO_4$ glass-ceramics is comparable to the transparency of the $Ta_{2-x}Al_xO_{5-x}$ glass-ceramics cerammed at 900 to 925° C., in part due to the $AlTaO_4$ crystallites being on the order of 15 nm in diameter (FIG. 3). However, the elastic modulus of the $AlTaO_4$+$AlPO_4$ glass-ceramics (e.g., 54 to 79 GPa) is typically lower than that of the $Ta_{2-x}Al_xO_{5-x}$ glass-ceramics (e.g., 77 to 91 GPa).

Referring to the Figures, FIGS. 1A and 1B show different X-ray diffraction patterns of the same source composition $9Ta_2O_5$:15 $Al_2O_3$:$6P_2O_5$:$70SiO_2$ that was separately cerammed under different conditions of: 925° C. for 2 hrs (FIG. 1A); and 1075° C. for 2 hrs (FIG. 1B). FIG. 1A shows an X-ray diffraction pattern of glass 1, which is Example 4 in Table 1, cerammed at 925° C. for 2 hrs; the crystal phase is $Ta_{2-x}Al_xO_{5-x}$. FIG. 1B shows an X-ray diffraction pattern of glass 1, which is Example 4 in Table 1, cerammed at 1075° C. for 2 hrs; the crystal phases are $AlTaO_4$ and $AlPO_4$.

Figure 2:
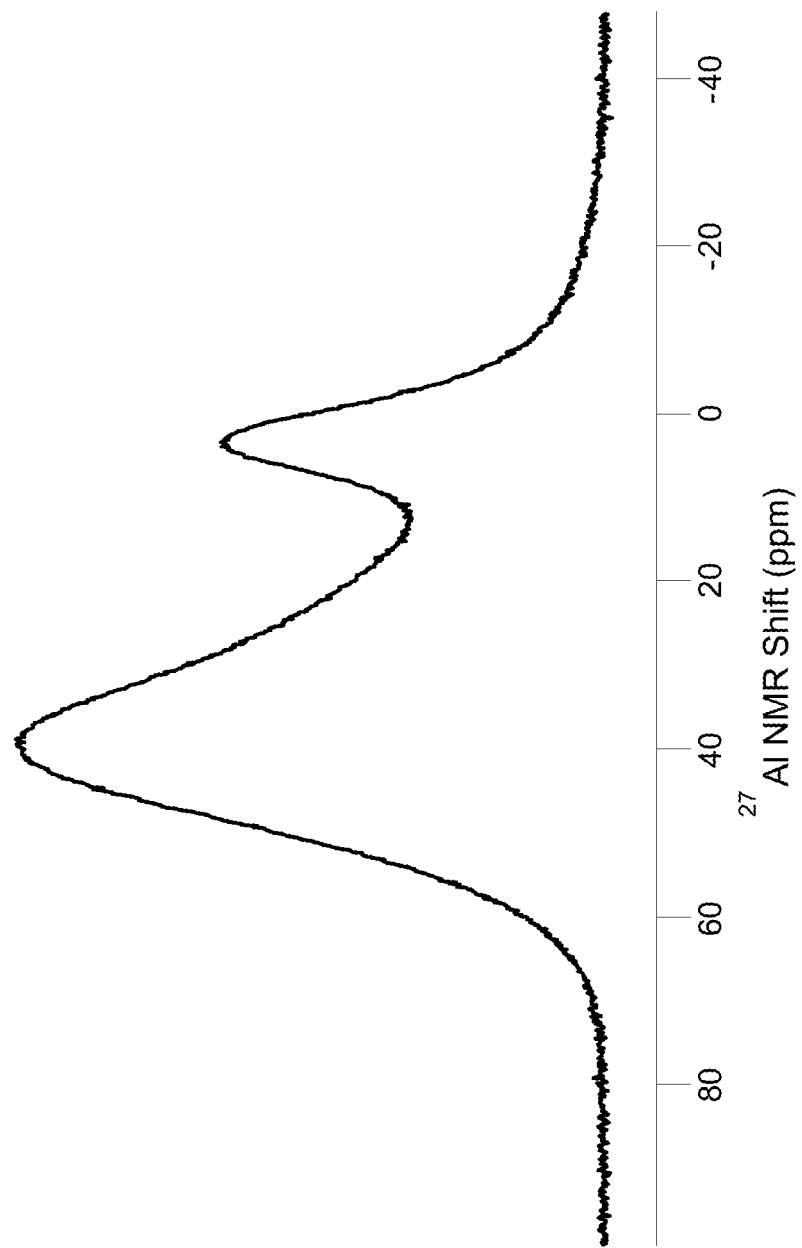
FIG. 2 shows a $^{27}Al$ MAS NMR spectrum of glass 1 (Example 4 in Table 1), cerammed at 950° C. for 2 hrs.

FIG. 2 shows a $^{27}Al$ MAS NMR spectrum of glass 1, which is Example 4 in Table 1, cerammed at 950° C. for 2 hrs, has a sharp peak near 0 ppm that shows the presence of six-coordinated aluminum in a crystalline environment, and a broad main peak near 40 ppm that shows the presence of four-coordinated aluminum in a glassy environment. Fitting the data in FIG. 2 indicated that 15% of the $Al_2O_3$ is 6-coordinated (for a $^{27}Al$ MAS NMR alumina film study see: A. Gleizes, et al., "Temperature Dependent 4-, 5- and 6-Fold Coordination of Aluminum in MOCVD-Grown Amorphous Alumina Films: From Local Coordination to Material Properties. Advances in Science and Technology, 2014, vol. 91, pp. 123-133).

FIGS. 3A and 3B show TEM photomicrograph images of glass 1, which is Example 4 in Table 1. The image in FIG. 3A was obtained from the composition (Example 4, Table 1, FIG. 1A) that was cerammed at schedule 1 (925° C. for 2 hrs) where the crystal phase is $Ta_{2-x}Al_xO_{5-x}$ and the crystallite sizes are about 5 to 15 nm. The image in FIG. 3B was obtained from a composition (Example 4, Table 1) that was cerammed at schedule 2 (875° C. for 2 hrs followed by 1075° C. for 2 hrs) where the crystalline assemblage is $AlTaO_4$ and $AlPO_4$, and the crystallite size is of from 15 to 25 nm.

Figure 7:
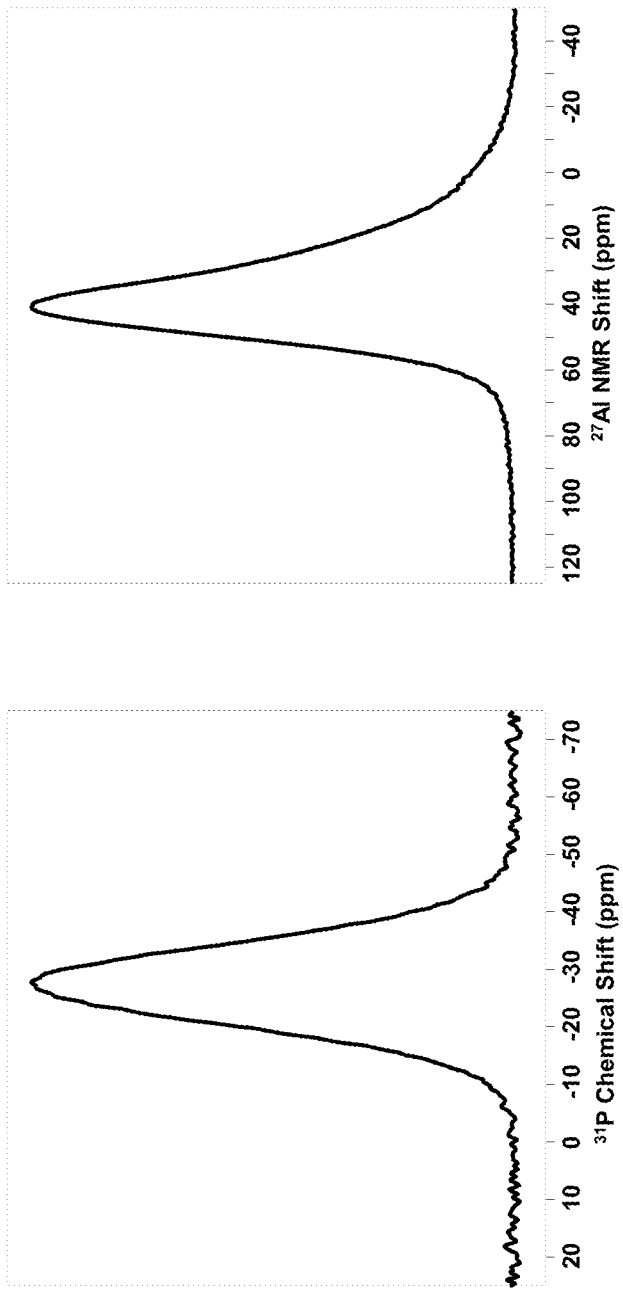
FIGS. 7A and 7B show the $^{31}P$ MAS NMR spectra and the $^{27}Al$ MAS NMR spectra, respectively, for the precursor glass of Example 1 in Table 1.

FIGS. 7A and 7B show the $^{31}P$ MAS NMR and the $^{27}Al$ MAS NMR, respectively, for the precursor glass of Example 1 in Table 1. Both the $^{31}P$ and $^{27}Al$ magic-angle spinning nuclear magnetic resonance (MAS NMR) spectra of the precursor glass Example 1 in Table 1, have broad NMR signals, and confirm the absence of any crystalline Al- or P-containing phases in the annealed glass.

Figure 8:
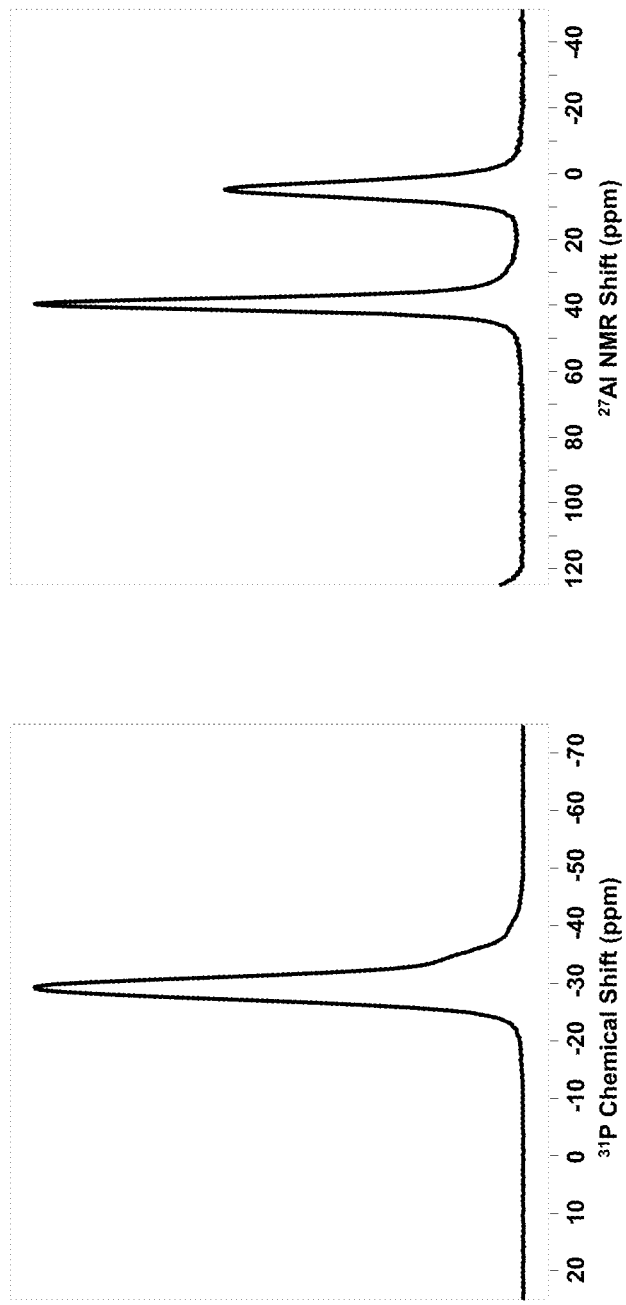
FIGS. 8A and 8B show the $^{31}P$ MAS NMR and $^{27}Al$ MAS NMR, respectively, for the cerammed glass of Example 1 in Table 1.

FIGS. 8A and 8B show the $^{31}P$ MAS NMR and the $^{27}Al$ MAS NMR, respectively, for the cerammed glass of Example 1 in Table 1.

The ceramming of Example 1 in Table 1 was accomplished at 925/2 then 1125/4, which ceramming schedule is similar but not identical to Schedule 2. The $^{31}P$ MAS NMR contains an intense, relatively sharp peak at −29 ppm. The position and shape of this peak is generally consistent with crystalline $AlPO_4$, in agreement with the XRD and $^{27}Al$ NMR data on similar samples. The P speciation, as measured by $^{31}P$ MAS NMR, is approximately 90% in crystalline $AlPO_4$ and 10% in residual glass, the residual glass is evident from the two weak signals around −35 to −37 ppm. The $^{27}Al$ MAS NMR data has two sharp peaks at 40 and 5 ppm, and the 40 ppm signal is consistent with four-coordinated Al in crystalline $AlPO_4$, and the 5 ppm signal is consistent with six-coordinated Al in crystalline $AlTaO_4$. These $^{27}Al$ NMR data indicate about 50% of $Al_2O_3$ in $AlPO_4$, about 40% of $Al_2O_3$ in $AlTaO_4$ and up to about 10% of $Al_2O_3$ in residual glass. The $Al_2O_3$ in residual glass is a weak, broad signal that lies under the $AlPO_4$ resonance at 40 ppm. Based on the peak areas in the $^{27}Al$ NMR data, 90 to 95% of the $P_2O_5$ is crystallized as $AlPO_4$, and 70 to 75% of the $Ta_2O_5$ is crystallized as $AlTaO_4$. The residual glass is silica rich, with a small amount of $Al_2O_3$ and $Ta_2O_5$, and a negligible amount of $P_2O_5$.

FIGS. 9A and 9B show the $^{31}P$ MAS NMR and the $^{27}Al$ MAS NMR spectra, respectively, of Example 4 in Table 1 after a ceramming treatment defined as Schedule 1 ("925/2").

The $^{31}P$ MAS NMR data (9A) contain an intense, single resonance from amorphous phosphate groups. The $^{27}Al$ MAS NMR spectrum (9B) is comprised of two peaks: the left peak is relatively broad and intense, consistent with four-coordinated Al in the glass, and the right peak at 3 ppm is significantly narrower and assigned to six-coordinated Al in crystalline $Ta_{2-x}Al_xO_{5-x}$. This sample after Schedule 1 ceramming has about 88% of $Al_2O_3$ in residual glass and 12% of $Al_2O_3$ in the $Ta_{2-x}Al_xO_{5-x}$ crystalline phase.

Figure 9:
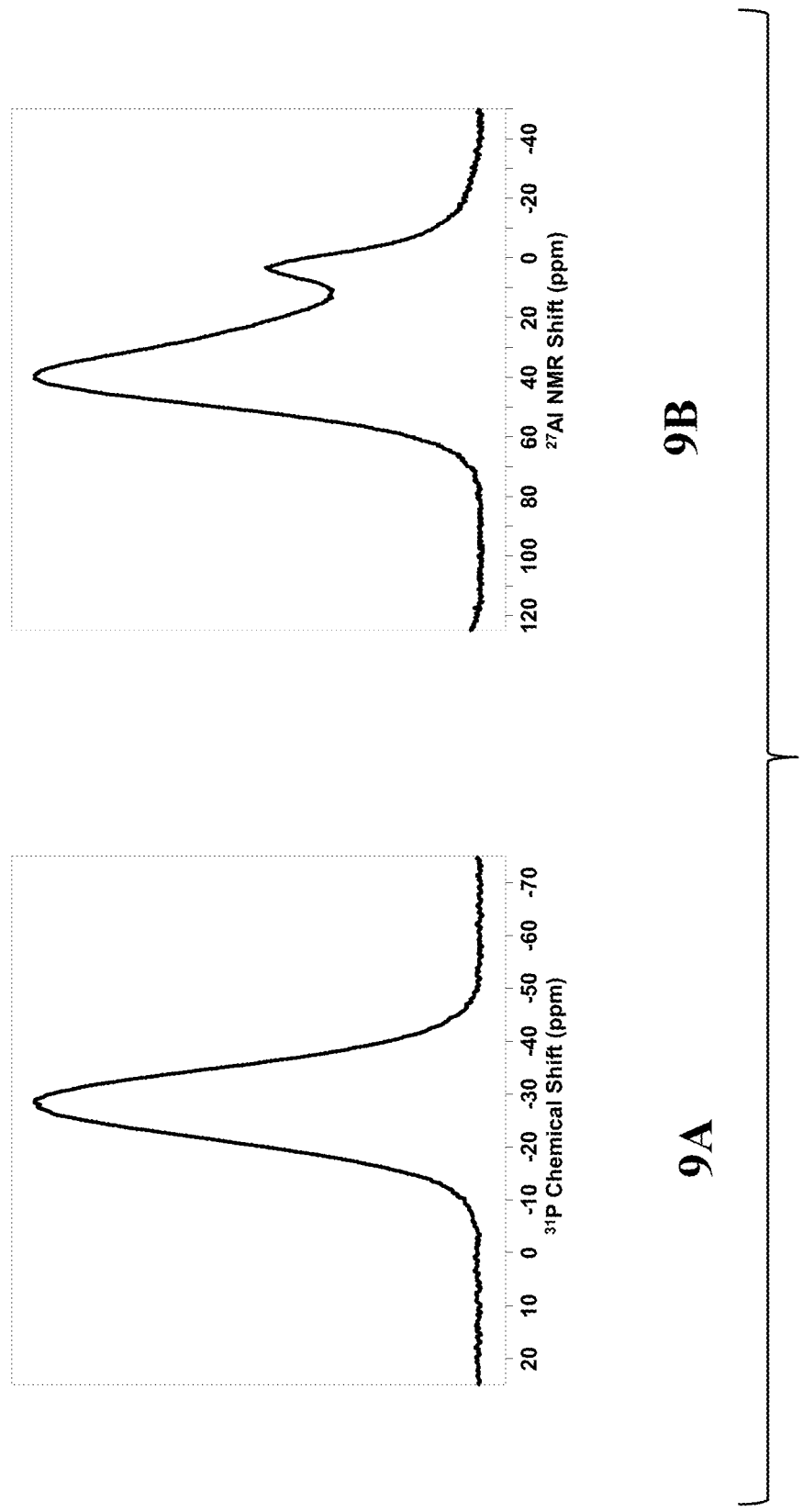
FIGS. 9A and 9B show the $^{31}P$ MAS NMR and the $^{27}Al$ MAS NMR spectra, respectively, of Example 4 in Table 1 after a ceramming treatment defined as Schedule 1 ("925/2").

FIG. 2 and FIG. 9B are very similar but are not exactly the same. FIG. 2 and FIG. 9B both represent $^{27}Al$ NMR of Example 4 in Table 1, but with ceramming at two different temperatures: 950/2 (FIG. 2) and 925/2 (FIG. 9). The results are nearly the same and confirm that Al partially enters the crystalline $Ta_{2-x}Al_xO_{5-x}$, phase and exhibits some temperature dependence on the amount of Al in this phase. Additionally, the $^{31}P$ NMR data in FIG. 9A indicate that P speciation is unaffected by "Schedule 1" and similar nucleation treatments.

Figure 10:
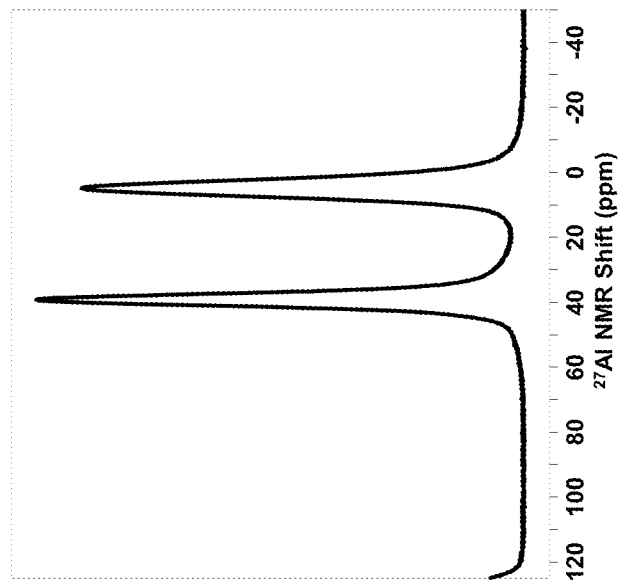
FIGS. 10A and 10B show the $^{31}P$ MAS NMR and the $^{27}Al$ MAS NMR spectra, respectively, of Example 4 in Table 1 after a ceramming treatment defined as Schedule 3 ("1075/2" only).
Figure 10:
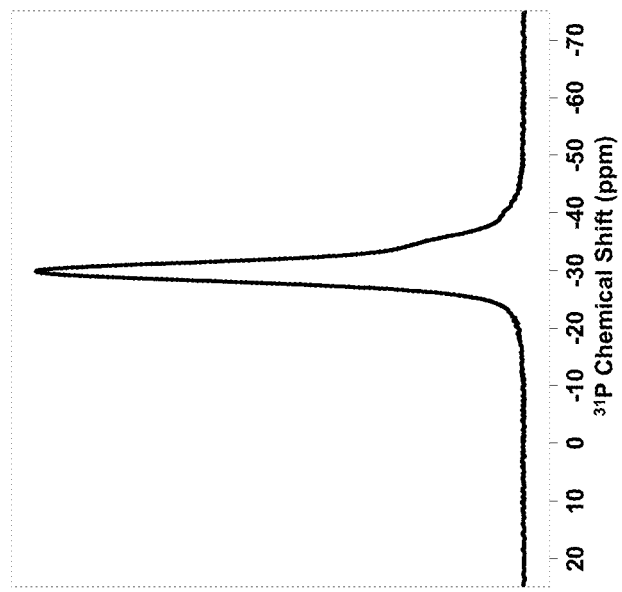

FIGS. 10A and 10B show the $^{31}P$ MAS NMR and $^{27}Al$ MAS NMR spectra, respectively, of Example 4 in Table 1 after a ceramming treatment defined as Schedule 3 ("1075/2" only). The $^{31}P$ NMR data (FIG. 10A) contain an intense, relatively sharp peak at −29 ppm. The position and shape of this peak are generally consistent with crystalline $AlPO_4$, in agreement with the XRD and $^{27}Al$ NMR data on similar samples. The P speciation, as measured by $^{31}P$ MAS NMR, is approximately 85% in crystalline $AlPO_4$ and 15% in residual glass. The 15% in residual glass is evident from the two weak signals around −35 to −40 ppm. The $^{27}Al$ MAS NMR data (FIG. 10B) are comprised of two sharp peaks at 40 and 5 ppm. The 40 ppm peak is consistent with four-coordinated Al in crystalline $AlPO_4$, and the 5 ppm peak is consistent with six-coordinated Al in crystalline $AlTaO_4$. These $^{27}Al$ NMR data indicate 35% of $Al_2O_3$ in $AlPO_4$, 45% of $Al_2O_3$ in $AlTaO_4$, and up to 20% of $Al_2O_3$ in residual glass. The up to 20% of $Al_2O_3$ in residual glass is reflected in a weak, broad signal that lies under the $AlPO_4$ resonance at 40 ppm. Based on the peak areas in the $^{27}Al$ NMR data, 85 to 90% of the $P_2O_5$ is crystallized as $AlPO_4$, and 75% of the $Ta_2O_5$ is crystallized as $AlTaO_4$. The residual glass is silica rich, with a small amount of $Al_2O_3$ and $Ta_2O_5$, and a negligible amount of $P_2O_5$.

EXAMPLES

The following Examples demonstrate making, use, and analysis of the disclosed glass-ceramics and methods in accordance with the above general procedures. The following are representative of preparative and comparative preparative examples followed by a characterization example. The Tables 1, 2, and 3 list representative composition examples identified in the table headers. The Table 4 lists crystalline assemblage(s) present at selected ceram temperatures. The Table 5 lists boron-containing $Ta_2O_5$ or $AlTaO_4$ transparent glass-ceramics; and Ga-containing $Ta_2O_5$ or $AlTaO_4$ transparent glass-ceramics.

Preparative Example 1

Preparation of Precursor Glass The precursor glasses were made by melting 800 g ball milled batches of the respective oxides and aluminum metaphosphate, with or without a dopant, in 650 cc Pt crucibles at 1650° C. for 16 to 20 hrs. The molten batches were quenched to glass by pouring onto steel. The glasses were then annealed at 800° C.

Preparative Example 2

Preparation of Glass-ceramics Glass-ceramics were prepared by cutting the annealed precursor glass of Example 1 into pieces and subjecting the pieces to a one-step or a two-step ceram schedule in the range of 875 to 1100° C. For the purposes of property evaluation, one of three ceramming schedules (1, 2, or 3) defined herein was used.

A number of ceramming schedules were investigated, including a two hr hold at every 25° from 900 and 1100° C. (see also Preparative Example 3 and Table 4). All 2 hr hold ceram schedules yielded transparent glass-ceramics. In embodiments, it can be sufficient to ceram by heating at a high temperature, e.g., 1,000 to 1,100° C. or more for less than 1 hr.

Ceram Schedule 1 was: heating the suitable precursor glass pieces at 8° C./min to 925° C., hold at 925° C. for 2 hrs, followed by cooling at furnace rate to ambient temperature of about 25° C. (abbreviated in the Tables as "925/2"=Schedule 1).

Ceram Schedule 2 was: heating at 8° C./min to 875° C., hold at 875° C. for 2 hrs (i.e., a nucleation step), heating at 8° C./min to 1075° C., hold at 1075° C. for 2 hrs (i.e., a crystal growth step) (abbreviated in the Tables as the hold temperature (° C.) and the hold time (hr) ratios such as "875/2" and then "1075/2" defines Schedule 2; or alternatively "1075/2" only is Schedule 3), followed by cooling at furnace rate to ambient temperature of about 25° C. The heating at 8° C./min to 875° C., hold at 875° C. for 2 hrs (i.e., a nucleation step) can be optional, that is unnecessary, since the glass may already have been pre-nucleated, i.e., chemically segregated as indicated by transmission electron microscopy, and either Schedule 2 or Schedule 3 is believed to produce the same product as measured by XRD. However, comparative property measurements for glass-ceramics with and without the 875° C. hold are presently unavailable and could indicate significant differences in the compositions.

Preparative Example 3

Figure 11:
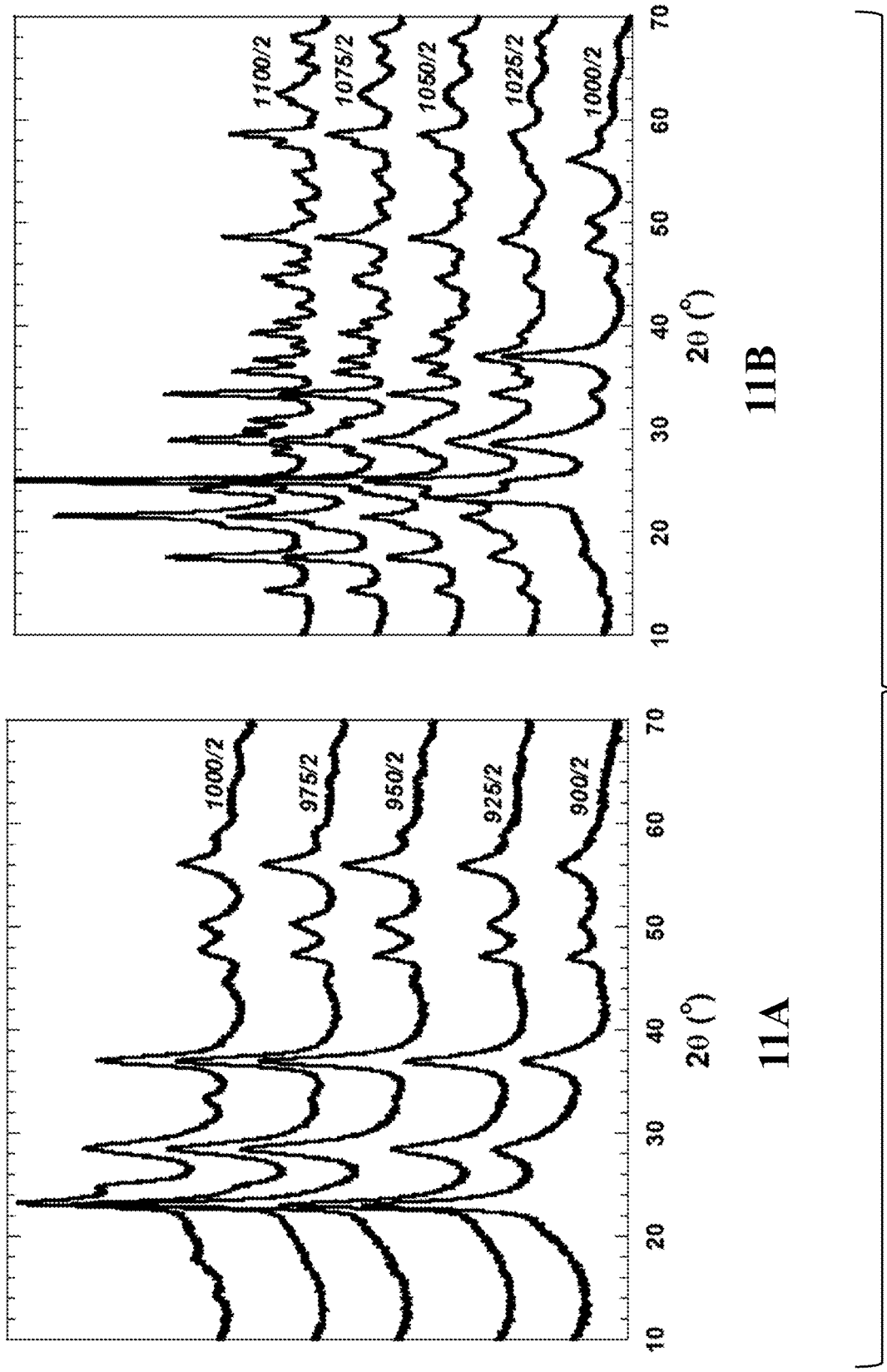
FIGS. 11A and 11B show the effect of increasing the ceramming temperature on phase assemblage in the disclosed method of making.

Influence of Ceram Condition on Crystalline Phase Assemblage of the Glass-Ceramics Preparative Example 3 is a study that demonstrates the effect on the crystalline phase assemblage of tabulated Example 4 of Table 1 by raising the 2 hr ceram temperature from 900 to 1100° C. in increments of 25°. Example 4 of Table 1 had an initial composition of $9Ta_2O_5:15Al_2O_3:6P_2O_5:70SiO_2$. FIGS. 11A and 11B show the effect of increasing the ceram temperature on phase assemblage in the disclosed method of making. The influence of ceram temperature on phase assemblage is shown in XRD patterns of the FIGS. 11A and 11B. FIG. 11A is a composite plot (i.e., an overlay for comparison) of the XRD patterns for ascending ceram temperatures 900, 925, 950, 975, or 1,000° C. FIG. 11B is also a composite plot (i.e., an overlay for comparison) of the XRD patterns for ascending ceram temperatures 1,000, 1,025, 1,050, 1,075, or 1,100° C. The XRD data shows that ceramming at 900, 925, or 950° C. for 2 hr yields "$Ta_2O_5$" (i.e., $Ta_{2-x}Al_xO_{5-x}$) as the sole crystalline phase. However, the increasing intensity of the major peak at 23° on raising the temperature from 900 to 925 to 950° C. indicates that the glass-ceramic contains a higher weight fraction or higher volume fraction of "$Ta_2O_5$" (i.e., $Ta_{2-x}Al_xO_{5-x}$) and a lower weight fraction or lower volume fraction of residual glass when cerammed at the higher temperatures in the range of 900 to 950° C. After ceramming at 975° C., the resulting glass-ceramic consists mainly of "$Ta_2O_5$" (i.e., $Ta_{2-x}Al_xO_{5-x}$) plus residual glass. However, there is a pronounced shoulder at about 24.5° indicating that $AlTaO_4$ has begun to crystallize and indicates the onset of the reaction of "$Ta_2O_5$" (i.e., $Ta_{2-x}Al_xO_{5-x}$) and residual glass to produce $AlTaO_4$. By 1000° C./2, the 24.5° shoulder is now a resolved peak. With a further increase in ceram temperature above 1000° C., the relative intensity of the main "$Ta_2O_5$" (i.e., $Ta_{2-x}Al_xO_{5-x}$) peak at 23° decreases, and the peak at 24.5° representing the main $AlTaO_4$ peak increases further. These XRD changes indicate the gradual conversion of "$Ta_2O_5$" (i.e., $Ta_{2-x}Al_xO_{5-x}$) and glass into $AlTaO_4$ with increasing temperature. This crystalline phase conversion appears to be complete by 1050° C. In addition, the appearance of an XRD diffraction peak at 21° in the 1025° C./2 sample signals the first appearance of $AlPO_4$ as an additional crystalline phase. $AlPO_4$ is present at all higher ceram temperatures. Table 4 summarizes the crystalline assemblage present at the selected ceram temperatures. The left to right listing of phases in Table 4 indicates their approximate relative abundance, e.g., for the 1025/2 sample, $AlTaO_4$ is the most abundant phase, followed by "$Ta_2O_5$" (i.e., $Ta_{2-x}Al_xO_{5-x}$), and $AlPO_4$ is the least abundant (i.e., $AlTaO_4 > Ta_2O_5 > AlPO_4$).

Comparative Preparative Example 3

A comparative glass having the formula: $4Ta_2O_5$: $18.5Al_2O_3$:$7.5P_2O_5$:$70SiO_2$, was prepared. The glass had a $Ta_2O_5$ content of below 5 mol %. This glass remains fully glassy, i.e., no crystalline phase was observed visually or by XRD when cerammed at temperatures as high as 1100° C.

Preparative Example 4

Gallium (Ga) was selected as a supplemental metal or metalloid for inclusion in a composition containing Al (and the $Al_2O_3$ content in the batch was reduced accordingly) in either of the phases, if present, of "$Ta_2O_5$" (i.e., $Ta_{2-x}Al_xO_{5-x}$) or $AlPO_4$ Table 5 lists three supplemental examples of Ga-containing $Ta_2O_5$ or $AlTaO_4$ transparent glass-ceramics.

Preparative Example 5

Similarly, boron (B) such as $B_2O_3$ was selected as a supplemental metal or metalloid for inclusion in a composition containing $SiO_2$ (and the $SiO_2$ content was reduced accordingly) in a transparent glass-ceramic composition which includes $Ta_2O_5$, $Al_2O_3$, $P_2O_5$ and $SiO_2$. Table 5 lists two supplemental examples of boron-containing $Ta_2O_5$ or $AlTaO_4$ transparent glass-ceramics.

Supplementing with Ga or B as indicated in Preparative Examples 4 and 5, respectively, had the advantage of lowering the viscosity at the melting and forming temperatures. However, the Ga or B supplemented compositions were disadvantaged by producing noticeable haze, particularly in glass-ceramics made at 925° C. (e.g., slight haze).

Characterization Example

Characterization of Young's elastic modulus (E), hardness (H), or refractive index (nD or nu) for a transparent glass-ceramic composition of the molecular formula $9Ta_2O_5$: $15Al_2O_3$:$6P_2O_5$:$70SiO_2$.

Figure 4:
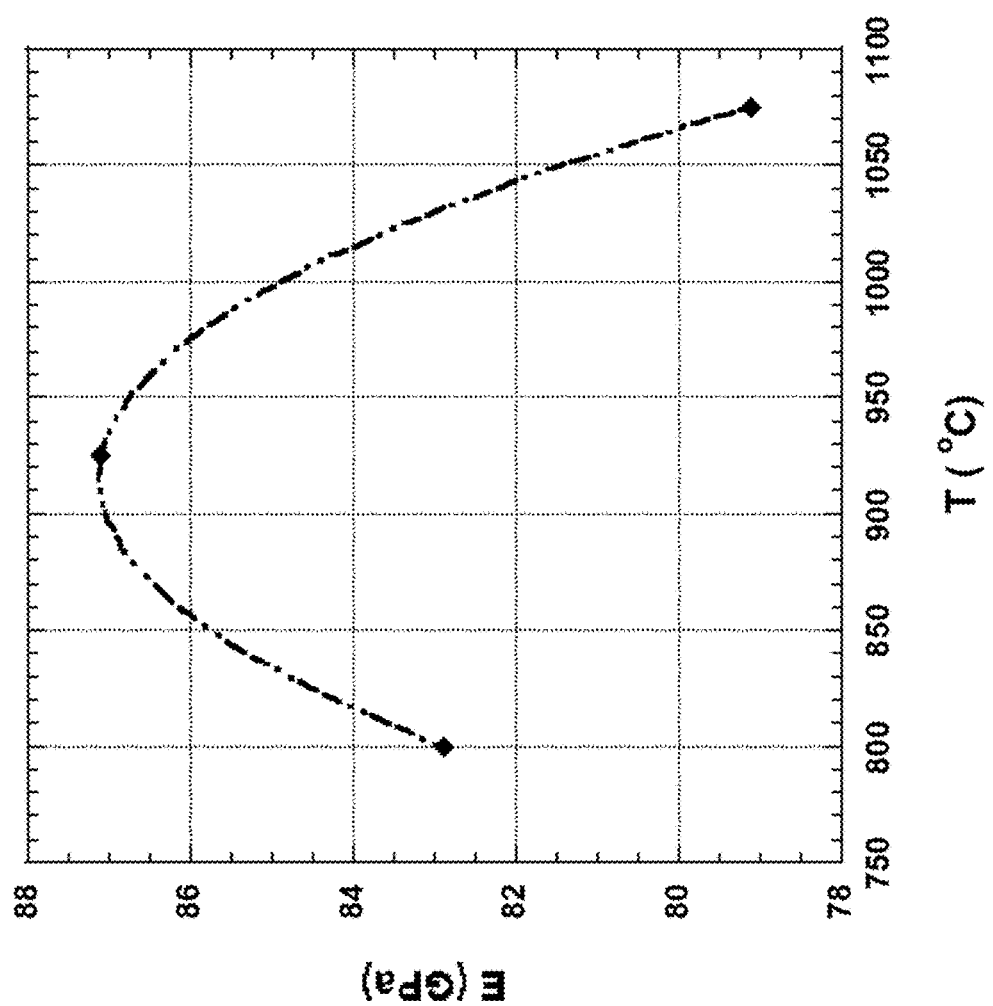
FIG. 4 shows dependence of Young's modulus (E) versus the ceram temperature for a composition of the formula: $9Ta_2O_5$:$15Al_2O_3$:$6P_2O_5$:$70SiO_2$ of Example 4 in Table 1.

FIG. 4 shows dependence of Young's modulus (E) versus the ceram temperature for a composition of the formula: $9Ta_2O_5$:$15Al_2O_3$:$6P_2O_5$:$70SiO_2$ of Example 4 in Table 1.

Figure 5:
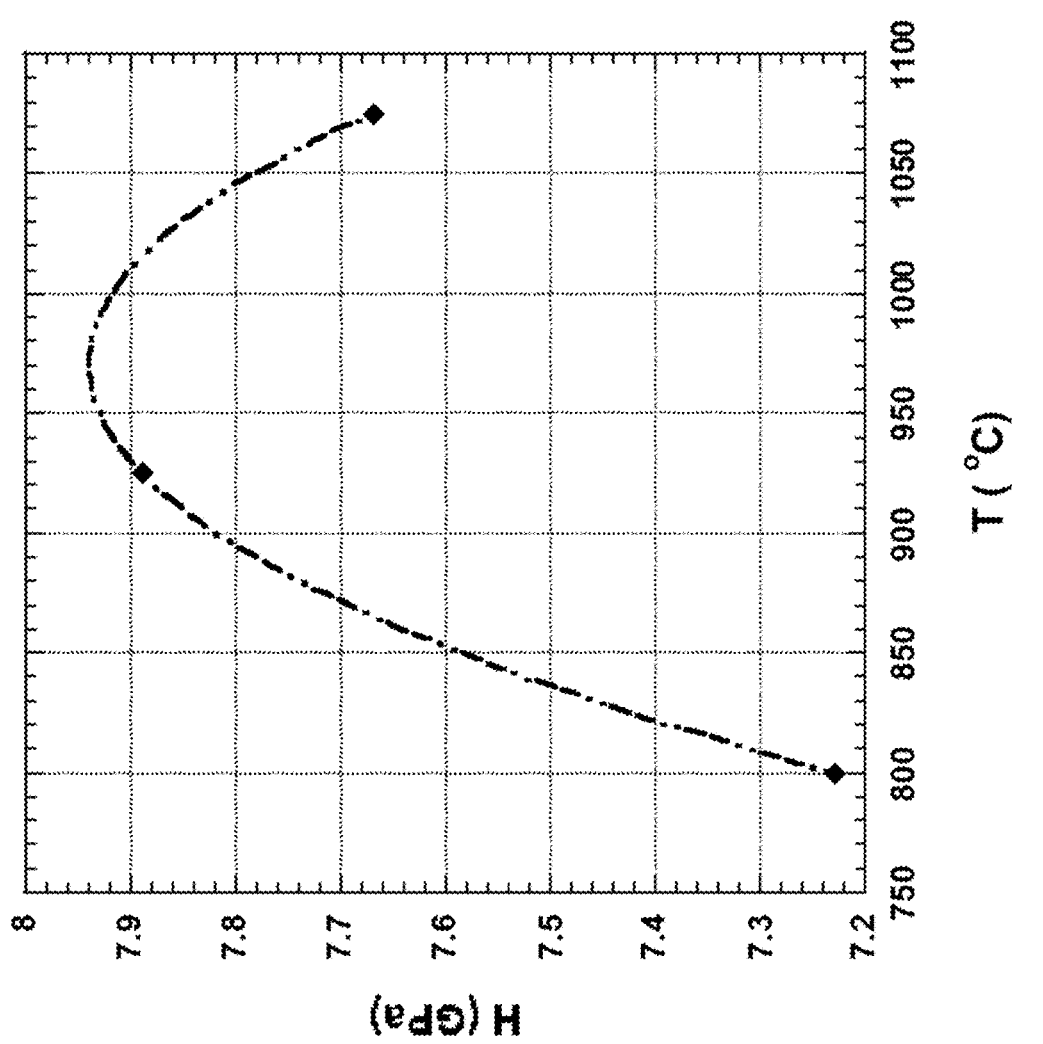
FIG. 5 shows hardness (H) versus the ceram temperature for a composition of the formula: $9Ta_2O_5$:$15Al_2O_3$:$6P_2O_5$:$70SiO_2$ of Example 4 in Table 1.

FIG. 5 shows hardness (H) versus the ceram temperature for a composition of the formula: $9Ta_2O_5$:$15Al_2O_3$:$6P_2O_5$: $70SiO_2$ of Example 4 in Table 1.

Figure 6:
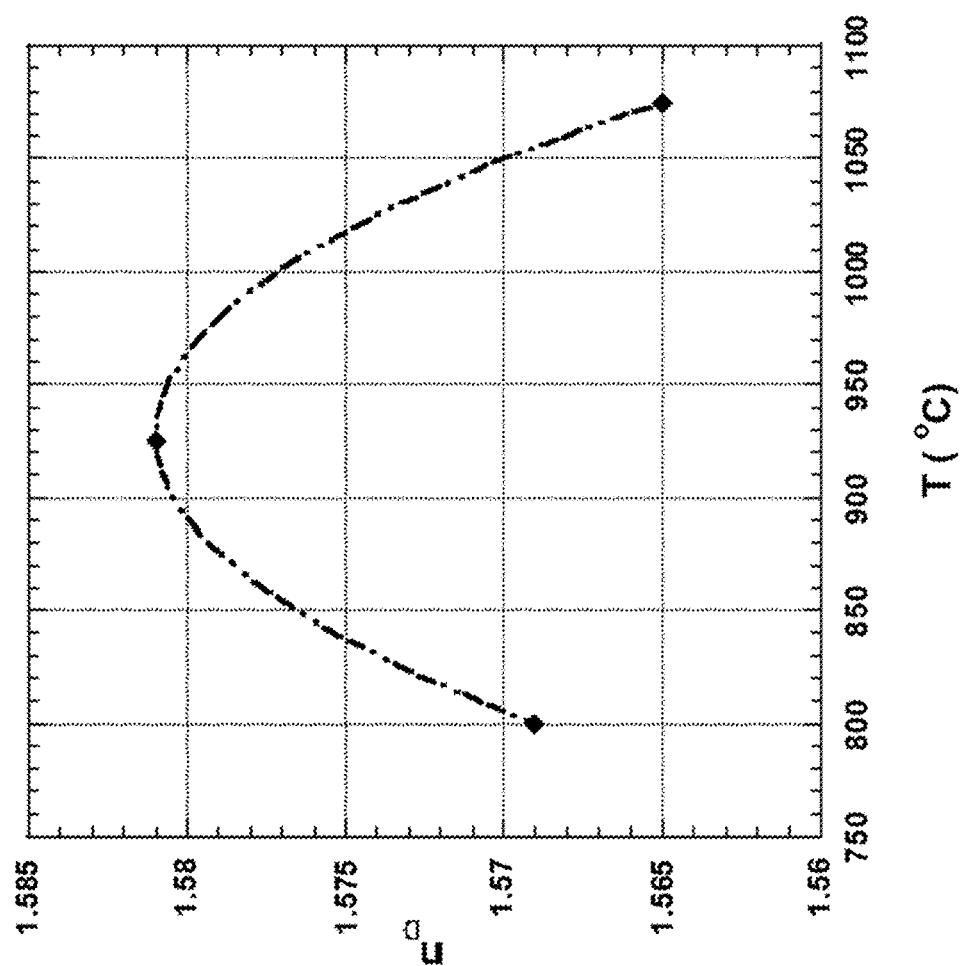
FIG. 6 shows the refractive index (nD or $n_D$) versus the ceram temperature for a composition of the formula: $9Ta_2O_5$:$15Al_2O_3$:$6P_2O_5$:$70SiO_2$ of Example 4. in Table 1

FIG. 6 shows the refractive index (nD or nD) versus the ceram temperature for a composition of the formula: $9Ta_2O_5$:$15Al_2O_3$:$6P_2O_5$:$70SiO_2$ of Example 4 in Table 1.

In each of FIGS. 4 to 6, the points at 800° C. correspond to the annealed, uncerammed glass. The points at 925° C. correspond to a $Ta_{2-x}Al_xO_{5-x}$ glass-ceramic made using the 925/2 schedule. The points at 1075° C. corresponds to a combined or a mixed $AlTaO_4$ and $AlPO_4$ glass-ceramic made using the combined 875/2 and 1075/2 ceram schedule 2 above. The E, H, and nD values are higher for the $Ta_{2-x}Al_xO_{5-x}$ (925° C.) glass-ceramic than for the mixed $AlTaO_4$ and $AlPO_4$ (1075° C.) glass-ceramic. This trend was also observed for all of the disclosed starting glass compositions when cerammed using Schedule 1 and was the basis for selecting the $Ta_{2-x}Al_xO_{5-x}$ glass-ceramics as the preferred disclosed glass-ceramics. For all examples for which E, H, and nD data are listed in Table 1 or 2, the value of each of E, H, and nD is always the greatest for the sample cerammed according to Schedule 1, i.e., the $Ta_{2-x}Al_xO_{5-x}$ glass-ceramic.

Table 1 contains the undoped (i.e., without the transition metal oxide dopants or rare earth oxide dopants) Examples 1 to 21. Table 1 includes: compositional data in both mol and wt %; property data on the annealed glasses; property data on the $Ta_{2-x}Al_xO_{5-x}$ glass-ceramics cerammed at 925° C. for 2 hrs; the crystal phase for each of glass-ceramic as observed by XRD; the appearance description; and property data for the $AlTaO_4$ and $AlPO_4$ glass-ceramics cerammed at 875° C. for 2 hrs followed by 1075° C. for 2 hrs. The samples of the transparent glass-ceramic compositions listed in Table 1 typically had a slight yellow or pale amber color, which may alternatively be indicative of minor iron contamination during work up.

FIGS. 1 to 2 and FIGS. 4 to 6 are related to composition Example 4 in Table 1, while the photomicrograph images in FIG. 3A (lower temperature ceramming) and FIG. 3B (higher temperature ceramming) are also for composition Example 4 in Table 1.

Table 2 contains the doped (i.e., with a transition metal oxide dopant or rare earth oxide dopant) Examples 22 to 26.

Regarding dopants, in antiquity erbia oxide ($Er_2O_3$, i.e., a Er sesquioxide) was used as a pink coloring agent in glazes and glasses. Modernly, erbia has been used as a luminescent dopant to provide fluorescence at 1.55 microns and is useful, for example, in optical amplifiers for telecommunications. The 1.55 microns wavelength is especially important for optical communications since standard single mode optical fibers have minimal loss at this particular wavelength.

In embodiments, the disclosure provides an optical article, such as a lens, a fiber, an amplifier component, and like articles, comprising: a transparent glass-ceramic composition including, for example, 65 to 75% $SiO_2$; 10 to 25% $Al_2O_3$; 5 to 15% $Ta_2O_5$; and 3 to 10% $P_2O_5$, based on 100 mol % total.

In embodiments, the optical article can further comprise, for example, a dopant comprising an oxide selected from Cr, Ni, Co, V, Mn, Cu, Er, or a mixture thereof.

In embodiments, the optical article can further comprise, for example, a supplement selected from the formulas $M_xO_y$ or $M_xM'_xO_y$, where M or M' is selected from the group of a source of Nb, Ti, W, Al, or a mixture thereof, x and x' are independently an integer from 1 to 2, and y is an integer from 1 to 5.

In embodiments, the disclosure provides an optical apparatus including the abovementioned optical article. In embodiments, the optical apparatus can be, for example, an optical fiber, such as a single mode fiber or a multimode fiber, a component of an optical amplifier for use in telecommunications, and like optical apparatus.

Tabulated Results

Exemplary examples of the disclosed transparent glass-ceramics are listed in Table 1 (i.e., Si—Al—Ta—P transparent glass-ceramic compositions and free of a dopant) and Table 2 (i.e., Si—Al—Ta—P transparent glass-ceramic compositions and containing a dopant). The disclosed sample compositions were characterized and their properties are also listed in Tables 1 and 2. Selected samples listed in Table 1, i.e., tabulated examples 1, 4, 6, 7, 8, 10, and 11, were cerammed according to Schedule 2 (i.e., 875/2, and then 1100/2) and they were all unexpectedly transparent after cooling to ambient temperature. Similarly, selected samples listed in Table 2, i.e., tabulated examples 25 and 26 were cerammed according to Schedule 2 (i.e., 875/2, and then 1100/2) and they were also unexpectedly transparent after cooling to ambient temperature.

Table 3 lists examples of the aforementioned Si—Al—Ta—P transparent glass-ceramic compositions free of dopant that have at least one supplemental metal, i.e., a portion (e.g., 0.1 to 50 mol %) of the Ta content is substituted or replaced with, for example, Nb, Ti, or W, to produce a Si—Al—Ta—P—Nb, a Si—Al—Ta—P—Ti, or a Si—Al—Ta—P—W transparent glass-ceramic composition.

Table 3 lists four compositions that demonstrate replacement of a portion of the Ta with, for example, Nb, Ti, or W, using, for example, a suitable source or oxide such as $Nb_2O_5$, $TiO_2$, or $WO_2$. The replacement or supplemental metal compositions results in compositions having transparent glass-ceramic properties and having the same phase assemblages, i.e., $Ta_2O_5$ ($Ta_{2-x}Al_xO_{5-x}$) at low ceram temperature (e.g., 925/2 schedule 1), and $AlTaO_4$ and $AlPO_4$ at high ceram temperature (e.g., 875/2, 1075/2 schedule 2). Unexpectedly, the replacement or supplemental metal compositions example compositions A, B, and C, retain transparency up to a temperature of as high as 1100° C. Although not limited by theory, the presently disclosed transparent glass-ceramics are the only glass-ceramics that are transparent when heated above 1000° C. (1832° F.), i.e., the transparency of the composition remains at of from 1,000 to 1,100° C. Although not limited by theory, the Ta content in the disclosed compositions when combined with selected ceramming conditions appears to provide or insures glass-ceramic transparency by, for example, limiting the size of the crystallites or microcrystals. The Ta content in the compositions of about 5 mol % or more appears to assure glass-ceramic transparency, i.e., a glass-ceramic transparency agent.

The tabulated properties of the disclosed transparent glass-ceramics have abbreviated labels:

$T_{str}$ is the strain point;
$T_{ann}$ is the anneal point;
$T_s$ is the softening point;
a300 (i.e., alpha three hundred) is the average thermal expansion coefficient (also known as linear coefficient of thermal expansion or CTE) from ambient such as room temperature 25° C. to 300° C. in $10^{-7}/°$ C.;
$T_g$ is the glass transition temperature;
$T_x$ is the onset of crystallization temperature;
r is the density in g/cc;
n is the Poisson's ratio;
nD or nD is the refractive index at the Na D line;
E is the Young's elastic modulus in GPa;
G is the shear modulus in GPa; and
H is the hardness in GPa.

The tabulated compositions also have abbreviated labels where:

"$Ta_2O_5$" is an abbreviation for the formula $Ta_{2-x}Al_xO_{5-x}$ crystal phase identified by x-ray diffraction, where x in this formula is less than 1 such as 0.5, 0.4, 0.3, 0.2, 0.1, 0.005, 0.001, and like values, including intermediate values and ranges.
"AP" is an abbreviation for the $AlPO_4$ crystal phase identified by x-ray diffraction.
"AT" is an abbreviation for the $AlTaO_4$ crystal phase identified by x-ray diffraction.
"AT+AP" is an abbreviation for a mixture of $AlTaO_4$ and $AlPO_4$ crystal phases.

TABLE 1

Transparent glass-ceramic compositions free of dopant.

| Composition Example | 1 | 2 | 3 | 4 | 5 | 6 | 7 | 8 | 9 | 10 |
|---|---|---|---|---|---|---|---|---|---|---|
| mol % | | | | | | | | | | |
| $Ta_2O_5$ | 8 | 7 | 8 | 9 | 8 | 7 | 10 | 10 | 8 | 9 |
| $Al_2O_3$ | 14.5 | 14.5 | 17.5 | 15 | 16 | 15.5 | 15.5 | 14 | 13 | 15 |
| $P_2O_5$ | 7.5 | 7.5 | 4.5 | 6 | 6 | 7.5 | 4.5 | 6 | 9 | 8 |
| $SiO_2$ | 70 | 70 | 70 | 70 | 70 | 70 | 70 | 70 | 70 | 68 |
| $SnO_2$ | — | 1 | — | — | — | — | — | — | — | — |
| wt % | | | | | | | | | | |
| $Ta_2O_5$ | 34.4 | 30.9 | 34.8 | 37.6 | 34.6 | 31.1 | 40.7 | 40.5 | 34.2 | 37.1 |
| $Al_2O_3$ | 14.4 | 14.8 | 17.5 | 14.5 | 16 | 15.9 | 14.6 | 13.1 | 12.8 | 14.3 |
| $P_2O_5$ | 10.4 | 10.7 | 6.28 | 8.06 | 8.33 | 10.7 | 5.89 | 7.81 | 12.3 | 10.6 |

TABLE 1-continued

|  | | | | | | | | | | |
|---|---|---|---|---|---|---|---|---|---|---|
| SiO₂ | 40.9 | 42.1 | 41.4 | 39.8 | 41.1 | 42.3 | 38.8 | 38.6 | 40.6 | 38.1 |
| SnO₂ | — | 1.51 | — | — | — | — | — | — | — | — |
| nD | — | — | — | 1.569 | — | — | — | — | — | — |
| Tstr (° C.) | 823 | 817 | — | — | — | — | — | — | — | — |
| Tann (° C.) | 871 | 869 | — | — | — | — | — | — | — | — |
| a300 | 12.4 | 12.5 | — | — | — | — | — | — | — | — |
| Tg (° C.) | 836 | — | 836 | 823 | 829 | 838 | 819 | 818 | 840 | 835 |
| Tx (° C.) | 959 | — | 1057 | 958 | 987 | 1036 | 947 | 917 | — | — |
| r (gm/cc) | — | — | — | 3.117 | — | — | — | — | — | — |
| E (GPa) | 79.4 | — | — | 82.9 | 83.4 | 79.4 | 89.3 | 84.3 | 76.5 | 79.7 |
| G (GPa) | 32.8 | — | — | 34.4 | 34.3 | 33 | 36.6 | 35 | 31.9 | 33.1 |
| n | 0.208 | — | — | 0.205 | 0.213 | 0.203 | 0.219 | 0.206 | 0.198 | 0.204 |
| H (GPa) | — | — | — | 7.23 | — | — | — | — | — | — |
| Schedule 1 925/2 ceram | Ta₂O₅ | | | Ta₂O₅ | | | | Ta₂O₅ | Ta₂O₅ | Ta₂O₅ |
| appearance | transp. | — | — | transp. | — | — | — | transp. | transp. | transp. |
| nD | 1.558 | — | — | 1.581 | — | — | — | 1.589 | — | 1.572 |
| a300 | — | — | — | — | — | — | 22.0 | 17.6 | — | 15.1 |
| r (gm/cc) | — | — | — | 3.153 | — | — | — | — | — | — |
| E (GPa) | 82.2 | — | — | 87.1 | — | — | — | 87.6 | 77.6 | 82.8 |
| G (GPa) | 34.1 | — | — | 36.3 | — | — | — | 36.6 | 32.7 | 34.5 |
| n | 0.204 | — | — | 0.201 | — | — | — | 0.204 | 0.187 | 0.198 |
| H (GPa) | — | — | — | 7.89 | — | — | — | — | — | — |
| Schedule 2 875/2, then 1075/2 ceram | AT + AP | AT + AP | AT + AP | AT + AP | AT + AP | AT + AP | AT + AP | AT + AP | AT + AP | AT + AP |
| appearance | transp. | hazy | — | transp. | transp. | transp. | transp. | transp. | transp. | transp. |
| nD | 1.548 | — | — | 1.565 | — | — | — | 1.572 | — | 1.558 |
| r (gm/cc) | — | — | — | 3.157 | — | — | — | — | — | — |
| E (GPa) | 70.4 | — | — | 79.1 | 61.4 | 58.3 | 77.2 | 71.4 | 53.6 | 59.6 |
| G (GPa) | 30.6 | — | — | 33.8 | 27.1 | 25.7 | 33.6 | 30.7 | 24.5 | 26.3 |
| n | 0.149 | — | — | 0.17 | 0.134 | 0.134 | 0.149 | 0.164 | 0.097 | 0.132 |
| H (GPa) | — | — | — | 7.67 | — | — | — | — | — | — |

| Example | 11 | 12 | 13 | 14 | 15 | 16 | 17 | 18 | 19 | 20 | 21 |
|---|---|---|---|---|---|---|---|---|---|---|---|
| mol % | | | | | | | | | | | |
| Ta₂O₅ | 9.5 | 8 | 11 | 9.5 | 11 | 8 | 9.5 | 11 | 12.5 | 9.5 | 8 |
| Al₂O₃ | 16 | 13 | 18.5 | 18.5 | 17 | 18.5 | 17 | 15.5 | 17 | 15.5 | 17 |
| P₂O₅ | 8.5 | 7 | 5.5 | 7 | 7 | 8.5 | 8.5 | 8.5 | 5.5 | 10 | 10 |
| SiO₂ | 66 | 72 | 65 | 65 | 65 | 65 | 65 | 65 | 65 | 65 | 65 |
| wt % | | | | | | | | | | | |
| Ta₂O₅ | 38.1 | 34.7 | 42.5 | 38.2 | 42.3 | 33.5 | 38 | 42.1 | 46.2 | 38 | 33.4 |
| Al₂O₃ | 14.8 | 13 | 16.5 | 17.2 | 15.1 | 17.9 | 15.7 | 13.7 | 14.5 | 14.2 | 16.4 |
| P₂O₅ | 11 | 9.76 | 6.83 | 9.04 | 8.64 | 11.5 | 10.9 | 10.4 | 6.53 | 12.8 | 13.4 |
| SiO₂ | 36 | 42.5 | 34.1 | 35.5 | 34 | 37.1 | 35.4 | 33.8 | 32.7 | 35.2 | 36.9 |
| Tg (° C.) | 829 | 832 | 822 | 830 | 825 | 835 | 834 | 821 | 831 | 851 | 849 |
| Tx (° C.) | — | — | 967 | 997 | 933 | — | 961 | — | 933 | 916 | 1017 |
| r (gm/cc) | 3.11 | — | 3.388 | — | — | — | — | 3.234 | — | — | — |
| E (GPa) | 81.4 | 77.2 | 90.5 | 85.7 | 86.8 | 81.5 | 82.1 | 81.8 | — | — | — |
| G (GPa) | 33.6 | 32.9 | 37.1 | 35.2 | 35.6 | 33.6 | 33.9 | 33.9 | — | — | — |
| n | 0.212 | 0.174 | 0.22 | 0.217 | 0.218 | 0.211 | 0.213 | 0.205 | — | — | — |
| H (GPa) | 6.44 | — | 7.5 | — | — | — | — | 6.98 | — | — | — |
| Schedule 1 925/2 ceram | Ta₂O₅ | — | — | — | Ta₂O₅ | — | — | — | — | — | — |
| appearance | transp. | — | — | — | transp. | — | — | — | — | — | — |
| nD | 1.577 | — | — | — | 1.604 | — | — | — | — | — | — |
| r (gm/cc) | 3.137 | — | — | — | — | — | — | — | 3.258 | — | — |
| E (GPa) | 83.7 | 81.7 | — | — | 90.5 | — | 85.4 | 85.5 | — | — | — |
| G (GPa) | 34.8 | 34.1 | — | — | 37.3 | — | 35.3 | 35.4 | — | — | — |
| n | 0.198 | 0.197 | — | — | 0.213 | — | 0.21 | 0.207 | — | — | — |
| H (GPa) | 7.45 | — | — | — | — | — | — | 7.41 | — | — | — |
| Schedule 2 875/2, then 1075/2 ceram | AT + AP | — | AT + AP | AT + AP | AT + AP | — | — | — | — | — | — |
| appearance | transp. | — | transp. | transp. | transp. | — | — | — | — | — | — |
| nD | 1.565 | — | 1.596 | — | 1.588 | — | — | — | — | — | — |
| r (gm/cc) | 3.16 | — | 3.478 | — | — | — | — | 3.288 | — | — | — |
| E (GPa) | 61.6 | 66.2 | 77.7 | 66.7 | 66.3 | 60.9 | 67.2 | 65.6 | — | — | — |
| G (GPa) | 27.2 | 28.9 | 33.4 | 29.1 | 29 | 26.8 | 29.4 | 28.7 | — | — | — |
| n | 0.135 | 0.145 | 0.165 | 0.147 | 0.146 | 0.139 | 0.144 | 0.144 | — | — | — |
| H (GPa) | 6 | — | 8.43 | — | — | — | — | 7.56 | — | — | — |

TABLE 2

Transparent glass-ceramic compositions including a dopant.

| Example | 22 | 23 | 24 | 25 | 26 |
|---|---|---|---|---|---|
| mol % | | | | | |
| $Ta_2O_5$ | 9 | 9 | 9 | 9 | 9 |
| $Al_2O_3$ | 15 | 15 | 15 | 15 | 15 |
| $P_2O_5$ | 6 | 6 | 6 | 6 | 6 |
| $SiO_2$ | 70 | 70 | 70 | 70 | 70 |
| $Cr_2O_3$ | 0.017 | — | — | — | — |
| NiO | — | 0.035 | — | — | — |
| CoO | — | — | 0.033 | — | — |
| $Er_2O_3$ | — | — | — | 0.015 | 0.075 |
| wt % | | | | | |
| $Ta_2O_5$ | 37.6 | 37.6 | 37.6 | 37.6 | 37.5 |
| $Al_2O_3$ | 14.5 | 14.5 | 14.5 | 14.5 | 14.4 |
| $P_2O_5$ | 8.06 | 8.06 | 8.06 | 8.05 | 8.04 |
| $SiO_2$ | 39.8 | 39.8 | 39.8 | 39.8 | 39.7 |
| $Cr_2O_3$ | 0.024 | — | — | — | — |
| NiO | — | 0.025 | — | — | — |
| CoO | — | — | 0.023 | — | — |
| $Er_2O_3$ | — | — | — | 0.05 | 0.27 |
| Schedule 1 925/2 ceram | $Ta_2O_5$ | $Ta_2O_5$ | $Ta_2O_5$ | $Ta_2O_5$ | $Ta_2O_5$ |
| Appearance, color | transparent, green | transp., amber | transp., blue | transp., amber | transp., amber |
| Schedule 2 875/2, then 1075/2 | AT + AP | AT + AP | AT + AP | AT + AP | AT + AP |
| Appearance, color | transparent, green | transp., amber | transp., blue | transp., amber | transp., amber |

TABLE 3

Metal supplemented transparent Ta containing glass-ceramic compositions.

| Example | A | B | C | D |
|---|---|---|---|---|
| mol % | | | | |
| $Ta_2O_5$ | 6.75 | 4.5 | 6.75 | 6.75 |
| $Nb_2O_5$ | 2.25 | 4.5 | | |
| $TiO_2$ | 2.25 | | 2.25 | |
| $WO_3$ | | | | 2.25 |
| $Al_2O_3$ | 15 | 15 | 15 | 15 |
| $P_2O_5$ | 6 | 6 | 6 | 6 |
| $SiO_2$ | 70 | 70 | 70 | 70 |
| wt % | | | | |
| $Ta_2O_5$ | 29.3 | 20.3 | 30.6 | 29.5 |
| $Nb_2O_5$ | 5.88 | 12.2 | | |
| $TiO_2$ | 1.84 | | 1.87 | |
| $WO_3$ | | | | 5.17 |
| $Al_2O_3$ | 15.0 | 15.6 | 15.7 | 15.2 |
| $P_2O_5$ | 8.37 | 8.71 | 8.73 | 8.44 |
| $SiO_2$ | 41.4 | 43 | 43.1 | 41.7 |
| Tg (° C.) | 800 | 773 | 816 | 813 |
| Tx (° C.) | 927 | 927 | 927 | 927 |
| Schedule 1 925/2 ceram | $Ta_2O_5$ | $Ta_2O_5 + AT$ | $Ta_2O_5 + AP$ | $Ta_2O_5$ |
| Appearance | transp. | transp. | translucent | transp. |
| Schedule 2 875/2 and 1075/2 ceram | AT + AP | AT + AP | AT + AP | AT + AP |
| Appearance | transp. | transp. | transp. | transp. |

TABLE 4

Crystalline assemblage(s) at selected ceram temperatures.

| Temperature (° C.) | Crystalline Assemblage(s) Present |
|---|---|
| 900 | $Ta_2O_5$ |
| 925 | $Ta_2O_5$ |
| 950 | $Ta_2O_5$ |
| 975 | $Ta_2O_5 + AlTaO_4$ |
| 1000 | $Ta_2O_5 + AlTaO_4$ |
| 1025 | $AlTaO_4 + Ta_2O_5 + AlPO_4$ |
| 1050 | $AlTaO_4 + AlPO_4$ |
| 1075 | $AlTaO_4 + AlPO_4$ |
| 1100 | $AlTaO_4 + AlPO_4$ |

TABLE 5

Boron-containing $Ta_2O_5$ or $AlTaO_4$ transparent glass-ceramics; and Ga-containing $Ta_2O_5$ or $AlTaO_4$ transparent glass-ceramics.

| Example | I | II | III | IV | V |
|---|---|---|---|---|---|
| mol % | | | | | |
| $Ta_2O_5$ | 9 | 9 | 9 | 9 | 11 |
| $Al_2O_3$ | 15 | 15 | 11.25 | 7.5 | 12.75 |
| $Ga_2O_3$ | — | — | 3.75 | 7.5 | 4.25 |
| $P_2O_5$ | 6 | 6 | 6 | 6 | 7 |
| $SiO_2$ | 68 | 66 | 70 | 70 | 65 |
| $B_2O_3$ | 2 | 4 | — | — | — |
| wt % | | | | | |
| $Ta_2O_5$ | 37.6 | 37.5 | 36.4 | 35.4 | 40.9 |
| $Al_2O_3$ | 14.4 | 14.4 | 10.5 | 6.81 | 10.9 |
| $Ga_2O_3$ | — | — | 6.44 | 12.5 | 6.7 |
| $P_2O_5$ | 8.04 | 8.03 | 7.8 | 7.58 | 8.36 |
| $SiO_2$ | 38.6 | 37.4 | 38.5 | 37.4 | 32.9 |
| $B_2O_3$ | 1.32 | 2.63 | — | — | — |
| Tg (° C.) | 800 | 780 | 796 | 774 | 798 |
| Tx (° C.) | 929 | 911 | 899 | 867 | 883 |
| Schedule 1 925/2 | $Ta_2O_5$ | $Ta_2O_5 + AT$ | $Ta_2O_5 + AT$ | $Ta_2O_5 + AT$ | $Ta_2O_5 + AT$ |
| Appearance | slight haze | slight haze | slight haze | slight haze | slight haze |
| Schedule 2 875/2, then 1075/2 | AT + AP | AT + AP | AT + AP | AT + AP | AT + AP |
| Appearance | transp. | transp. | transp. | transp. | transp. |

The disclosure has been described with reference to various specific embodiments and techniques. However, many variations and modifications are possible while remaining within the scope of the disclosure.

What is claimed is:

1. A method of making a transparent glass-ceramic composition, comprising:
   ceramming a precursor glass composition at a temperature in a range of from 900° C. to 1100° C. for a time in a range of from 0.5 hours to 10 hours,
   wherein the precursor glass composition comprises:
   65 to 75% $SiO_2$,
   10 to 25% $Al_2O_3$,
   5 to 15% $Ta_2O_5$, and
   3 to 10% $P_2O_5$, based on a 100 mol % total.

2. The method of making the transparent glass-ceramic composition of claim 1, further comprising:
   including a dopant in an amount of 1 mol % or less based on the 100 mol % of the precursor glass composition, and the dopant is selected from the group of a Cr oxide, a Ni oxide, a Co oxide, a rare earth oxide, or a mixture thereof.

3. The method of making the transparent glass-ceramic composition of claim 1, wherein the dopant is an oxide selected from oxides of Cr, Ni, Co, V, Mn, Cu, Er, or a mixture thereof.

4. The method of making the transparent glass-ceramic composition of claim 1, wherein the ceramming is conducted at a temperature in a range of from 900° C. to 950° C. for a time in a range of from 1 hour to 4 hours.

5. The method of making the transparent glass-ceramic composition of claim 1, wherein the transparent glass-ceramic comprises a main crystalline phase of a formula of $Ta_{2-x}Al_xO_{5-x}$, where x is less than 1 and greater than 0.001.

6. The method of making the transparent glass-ceramic composition of claim 1, wherein the transparent glass-ceramic comprises crystalline phase comprising a mixture of $AlTaO_4$ and $AlPO_4$.

7. The method of making the transparent glass-ceramic composition of claim 1, further comprising including a dopant in an amount of 1 mol % or less based on the 100 mol % total of the precursor glass composition, and the dopant is selected from the group of a Cr oxide, a Ni oxide, a Co oxide, a rare earth oxide, a V oxide, a Mn oxide, a Cu oxide, an Er oxide, or mixtures thereof.

8. The method of making the transparent glass-ceramic composition of claim 1, wherein precursor glass composition comprises:
   65 to 75% $SiO_2$,
   10 to 20% $Al_2O_3$,
   8 to 13% $Ta_2O_5$, and
   4 to 9% $P_2O_5$, based on a 100 mol % total.

9. A method of making a transparent glass-ceramic composition, comprising:
   ceramming a precursor glass composition at a temperature in a range of from 900° C. to 1100° C. for a time in a range of from 0.5 hours to 10 hours,
   wherein the glass-ceramic composition has a crystalline phase comprising a mixture of $AlTaO_4$ and $AlPO_4$.

10. The method of making the transparent glass-ceramic composition of claim 9, further comprising:
    including a dopant in an amount of 1 mol % or less based on the 100 mol % of the precursor glass composition, and the dopant is selected from the group of a Cr oxide, a Ni oxide, a Co oxide, a rare earth oxide, or a mixture thereof.

11. The method of making the transparent glass-ceramic composition of claim 9, wherein the dopant is selected from oxides of Cr, Ni, Co, V, Mn, Cu, Er, or a mixture thereof.

12. The method of making the transparent glass-ceramic composition of claim 9, wherein the ceramming is conducted at a temperature in a range of from 900° C. to 950° C. for a time in a range of from 1 hour to 4 hours.

13. The method of making the transparent glass-ceramic composition of claim 9, wherein the precursor glass composition comprises:
    10 to 25% $Al_2O_3$, and
    5 to 15% $Ta_2O_5$, based on a 100 mol % total.

14. The method of making the transparent glass-ceramic composition of claim 9, wherein the precursor glass composition comprises:
    10 to 20% $Al_2O_3$, and
    8 to 13% $Ta_2O_5$, based on a 100 mol % total.

15. The method of making the transparent glass-ceramic composition of claim 9, wherein the precursor glass composition comprises:
    10 to 25% $Al_2O_3$, and
    4 to 7.5% $Ta_2O_5$, based on a 100 mol % total.

16. The method of making the transparent glass-ceramic composition of claim 9, wherein the precursor glass composition comprises:
    2 to 17% $Al_2O_3$, and
    4 to 7.5% $Ta_2O_5$, based on a 100 mol % total.

\* \* \* \* \*